(12) United States Patent
Schekulin

(10) Patent No.: US 10,811,984 B2
(45) Date of Patent: Oct. 20, 2020

(54) BIDIRECTIONAL DC-TO-DC CONVERTER WITH VOLTAGE LIMITATION DEVICE INCLUDING SWITCHING ELEMENT AND VOLTAGE LIMITATION CAPACITOR

(71) Applicant: Schmidhauser AG, Romanshorn (CH)

(72) Inventor: Dirk Schekulin, Gais (CH)

(73) Assignee: Schmidhauser AG, Romanshorn (CH)

( * ) Notice: Subject to any disclaimer, the term of this patent is extended or adjusted under 35 U.S.C. 154(b) by 0 days.

(21) Appl. No.: 15/567,667

(22) PCT Filed: Apr. 22, 2016

(86) PCT No.: PCT/EP2016/059049
§ 371 (c)(1),
(2) Date: Oct. 19, 2017

(87) PCT Pub. No.: WO2016/170136
PCT Pub. Date: Oct. 27, 2016

(65) Prior Publication Data
US 2018/0138819 A1 May 17, 2018

(30) Foreign Application Priority Data

Apr. 24, 2015 (DE) .................. 10 2015 207 607

(51) Int. Cl.
*H02M 3/335* (2006.01)
*H02M 1/32* (2007.01)
*H02M 3/28* (2006.01)

(52) U.S. Cl.
CPC ......... *H02M 3/33584* (2013.01); *H02M 1/32* (2013.01); *H02M 3/285* (2013.01); *H02M 3/33592* (2013.01)

(58) Field of Classification Search
CPC ......... H02M 3/33507; H02M 3/33569; H02M 3/33576; H02M 3/33592; H02M 7/219; H02M 7/5383; H02M 2001/0058
See application file for complete search history.

(56) References Cited

U.S. PATENT DOCUMENTS 5,027,264 A 6/1991 DeDoncker et al.
5,636,107 A 6/1997 Lu et al.
(Continued)

FOREIGN PATENT DOCUMENTS

CH 704 460 A2 8/2012
CN 1545195 A 11/2004
(Continued)

OTHER PUBLICATIONS

International Search Report (PCT/ISA/210) issued in PCT Application No. PCT/EP2016/059049 dated Aug. 22, 2016 with English translation (5 pages).
German-language Written Opinion (PCT/ISA/237) issued in PCT Application No. PCT/EP2016/059049 dated Aug. 22, 2016 (6 pages).
(Continued)

*Primary Examiner* — Adolf D Berhane
*Assistant Examiner* — Afework S Demisse
(74) *Attorney, Agent, or Firm* — Crowell & Moring LLP

(57) ABSTRACT

A bidirectional DC-to-DC converter include a first half-bridge circuit, a second half-bridge circuit, at least one transformer having a first primary winding and a second primary winding and at least one secondary winding. The first half-bridge circuit is designed to generate an AC voltage at the first primary winding, and the second half-bridge circuit is designed to generate an AC voltage at the second primary winding. At least one bidirectional power converter circuit is electrically coupled to the secondary winding in a bridge arrangement. The bridge arrangement has a first bridge connection pole and a second bridge connection pole. The power converter circuit includes a voltage limitation device having a switching element.

6 Claims, 4 Drawing Sheets

(56) References Cited

U.S. PATENT DOCUMENTS

| | | | |
|---|---|---|---|
| 6,501,193 B1 | 12/2002 | Krugly | |
| 9,337,743 B2* | 5/2016 | Dai | H02M 3/3353 |
| 9,401,658 B2* | 7/2016 | Bao | H02M 7/17 |
| 2002/0126517 A1* | 9/2002 | Matsukawa | H02M 3/33569 363/69 |
| 2006/0139823 A1 | 6/2006 | Shoji et al. | |
| 2011/0037319 A1* | 2/2011 | Matsui | H02M 3/33584 307/43 |
| 2011/0090717 A1 | 4/2011 | Lee et al. | |
| 2011/0149609 A1 | 6/2011 | Moussaoui et al. | |
| 2011/0280048 A1 | 11/2011 | Fujiyoshi et al. | |
| 2012/0153729 A1 | 6/2012 | Song et al. | |
| 2013/0135904 A1* | 5/2013 | Murayama | H02M 3/33561 363/17 |
| 2015/0280589 A1 | 10/2015 | Schekulin et al. | |
| 2016/0181925 A1* | 6/2016 | Chiang | H02M 3/33584 363/17 |
| 2018/0152115 A1* | 5/2018 | Yan | H02M 7/797 |

FOREIGN PATENT DOCUMENTS

| | | |
|---|---|---|
| CN | 1552120 A | 12/2004 |
| DE | 10 2012 219 365 A1 | 4/2014 |
| EP | 1 677 410 A1 | 7/2006 |
| WO | WO 97/18618 A1 | 5/1997 |

OTHER PUBLICATIONS

Li et al., "Analysis and Design of Improved Isolated Full-Bridge Bi-Directional DC-DC Converter", 2004 $35^{th}$ Annual IEEE Power Electronics Specialists Conference, 2004, pp. 521-526.

Park et al., "A Soft-Switching Active-Clamp Scheme for Isolated Full-Bridge Boost Converter", IEEE, 2004 (4 pages).

Yakushev et al., "Full-Bridge Isolated Current Fed Converter with Active Clamp", IEEE, 1999, pp. 560-566.

English translation of Chinese Office Action issued in counterpart Chinese Application No. 201680023747.6 dated Oct. 14, 2019 (15 pages).

Jeyakarthikha et al., "Multiport bidirectional dc-dc converter for energy storage applications", 2014 International Conference on Circuit, Power and Computing Technologies [ICCPCT], Mar. 5, 2015, pp. 411-417 (eight pages).

Cho et al., "Zero-Voltage and Zero-Current-Switching Full-Bridge PWM Converter Using Secondary Active Clamp", IEEE Transactions on Power Electronics, Jul. 31, 1998, pp. 601-607, vol. 13, No. 4 (seven pages).

Chinese-language Office Action issued in counterpart Chinese Application No. 201680023747.6 dated Mar. 5, 2019 with English Translation (20 pages).

Shangzun Y. et al., "Electric and Electronic Technology Foundation (Second Edition)", China Water Resources and Hydropower Press, Aug. 31, 2004, pp. 347-348 (four (4) pages).

* cited by examiner

BIDIRECTIONAL DC-TO-DC CONVERTER WITH VOLTAGE LIMITATION DEVICE INCLUDING SWITCHING ELEMENT AND VOLTAGE LIMITATION CAPACITOR

BACKGROUND AND SUMMARY OF THE INVENTION

The invention relates to a bidirectional DC-to-DC converter.

Various topologies for DC-to-DC converters for high output currents are known. Full-bridge circuits comprising a winding which is divided on the output side or a current doubler circuit are often used.

When using intermediate circuit voltages of up to 850 V, IGBTs (insulated gate bipolar transistors) having a dielectric strength of 1200 V are preferably used, which results in a considerable upper restriction of the switching frequency, as a result of which relatively large inductive components become necessary.

DE 10 2012 219 365 A1 discloses a unidirectional DC-to-DC converter in which two asymmetric half-bridges operate on a divided primary winding of a transformer. This makes it possible to use MOSFETs as switching elements, as a result of which the switching frequency can be considerably increased.

The invention is based on the object of providing a DC-to-DC converter which can be flexibly used, in particular, in vehicle electrical systems of motor vehicles with regard to the different voltage levels which can be encountered there.

The invention achieves this object by means of a DC-to-DC converter comprising: a first half-bridge circuit; a second half-bridge circuit; at least one transformer comprising a first primary winding and a second primary winding and at least one secondary winding, the first half-bridge circuit being designed to generate an AC voltage at the first primary winding, and the second half-bridge circuit being designed to generate an AC voltage at the second primary winding; and at least one bidirectional power converter circuit which is electrically coupled to the secondary winding in a bridge arrangement, the bridge arrangement comprising a first bridge connection pole and a second bridge connection pole. The power converter circuit includes a voltage limitation device having a switching element.

The bidirectional (electrical energy can be transmitted in both directions) DC-to-DC converter comprises a first asymmetric half-bridge circuit and a second asymmetric half-bridge circuit.

The DC-to-DC converter also comprises at least one transformer, in particular a DC-isolating transformer, comprising a first primary winding and a second primary winding and at least one secondary winding. The first half-bridge circuit generates an AC voltage at the first primary winding, and the second half-bridge circuit generates an AC voltage at the second primary winding.

The DC-to-DC converter also comprises at least one bidirectional power converter circuit which is electrically coupled to the secondary winding(s) in a bridge arrangement and is supplied with energy by the secondary windings, the bridge arrangement comprising a first bridge connection pole and a second bridge connection pole between which two bridge branches are looped in. The power converter circuit comprises a voltage limitation device with a switching element, for example in the form of a transistor, the voltage limitation device implementing an "active clamp" function. With regard to the "active clamp" function, reference is also made to the relevant specialist literature.

The voltage limitation device may comprise a capacitor, the switching element and the capacitor being looped in in series between the first bridge connection pole and the second bridge connection pole.

The DC-to-DC converter may comprise a first output connection pole and a second output connection pole, an output voltage being present between the first output connection pole and the second output connection pole. The term "output" is used in the present case only to conceptually distinguish between the two sides of the DC-to-DC converter. Since the DC-to-DC converter is bidirectional, energy can also flow into the DC-to-DC converter via the output connection poles. The DC-to-DC converter may also comprise a coil and a polarity reversal protection transistor, the coil and the polarity reversal protection transistor being looped in in series between the first bridge connection pole and the first output connection pole or between the second bridge connection pole and the second output connection pole.

The DC-to-DC converter may comprise a (power converter) capacitor, this capacitor being looped in between a connecting node of the coil and of the polarity reversal protection transistor and the second output connection pole.

The first half-bridge circuit and the second half-bridge circuit may be connected in series or in parallel. In the case of a 400-V vehicle electrical system, the half-bridge circuits may be connected in parallel, for example. If the first and second half-bridge circuits are connected in parallel, input connections of the first and second half-bridge circuits are connected in parallel, the same input voltage being present at the input connections, for example a vehicle electrical system voltage of 400 V in each case. In the case of an 800-V vehicle electrical system, the half-bridge circuits may be connected in series, for example. If the first and second half-bridge circuits are connected in series, the input connections of the first and second half-bridge circuits are connected in series, with the result that only half of the vehicle electrical system voltage is present at the input connections, that is to say an input voltage of only 400 V is respectively present in the case of a vehicle electrical system voltage of 800 V on account of the series circuit.

The transformer may comprise a first secondary winding and a second secondary winding, the first secondary winding and the second secondary winding being connected in series or in parallel. In the case of a desired output voltage of 24 V, the secondary windings can be connected in parallel, for example. In the case of a desired output voltage of 48 V, the secondary windings can be connected in series, for example.

A first power converter circuit and a second power converter circuit may be provided, the first power converter circuit being electrically coupled to the first secondary winding, and the second power converter circuit being electrically coupled to the second secondary winding. This considerably increases the flexibility.

The DC-to-DC converter according to the invention which can be used as a vehicle electrical system converter, for example, enables, for example, bidirectional energy exchange between a high-voltage vehicle electrical system with a rated voltage of 800 V, for example, and a low-voltage vehicle electrical system with a rated voltage of 24 V, for example, as are present in modern electric or hybrid vehicles.

On account of the topology and the properties of the components used, different voltage levels can be economically covered both at the high voltage level (for example 400

V/800 V) and at the low voltage level (for example 24 V/48 V) as a result of flexible connection.

BRIEF DESCRIPTION OF THE DRAWINGS

The invention is described in detail below with reference to the drawings, in which.

DETAILED DESCRIPTION OF THE DRAWINGS

Figure 1:
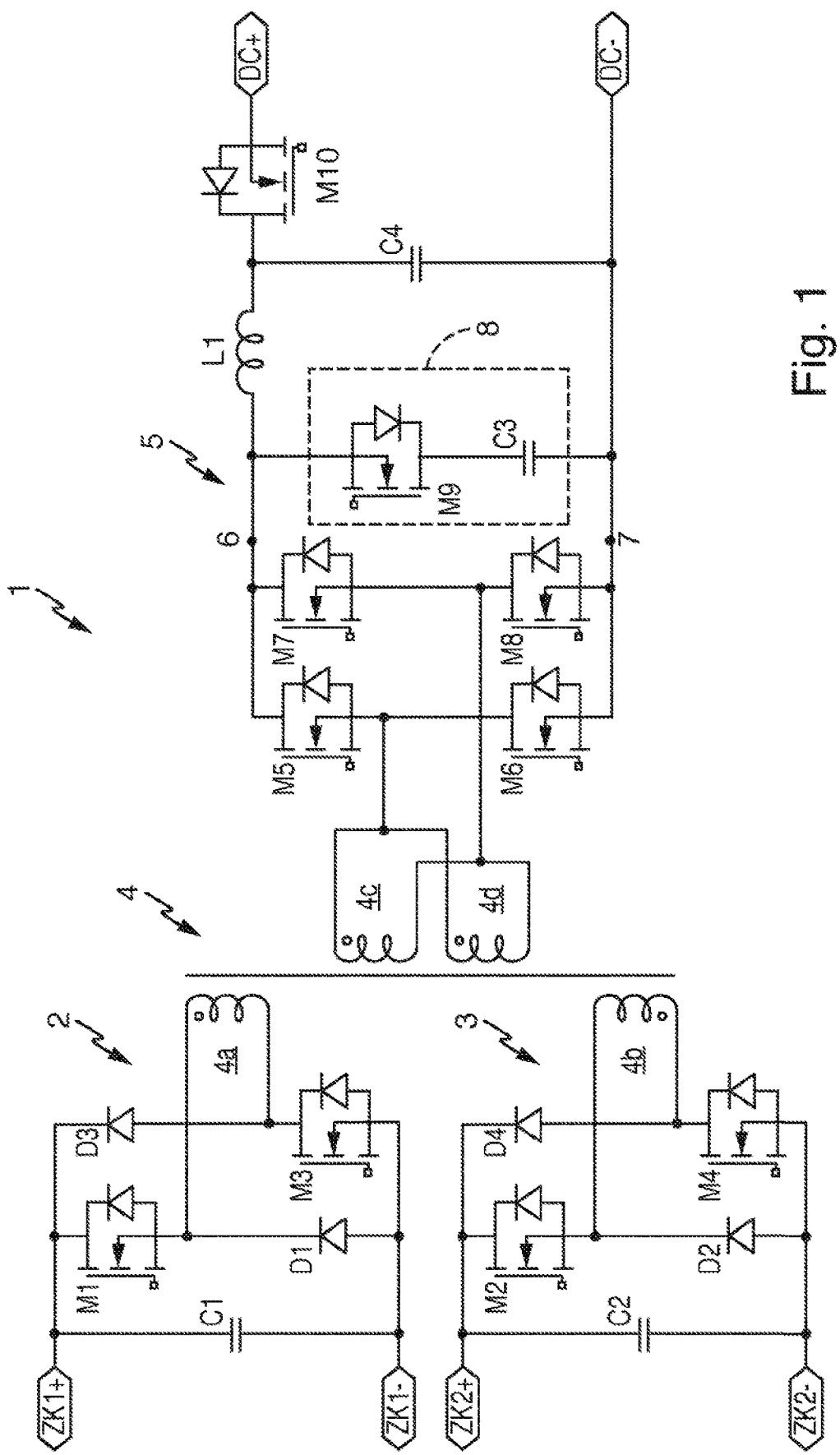
FIG. 1 shows a circuit diagram of a DC-to-DC converter according to the invention in accordance with a first embodiment.

FIG. 1 shows a bidirectional DC-to-DC converter 1 in accordance with a first embodiment which can be used as a vehicle electrical system converter in a motor vehicle, for example.

The DC-to-DC converter 1 comprises a first asymmetric half-bridge circuit 2 and a second asymmetric half-bridge circuit 3 which can be connected to an intermediate circuit, for example, at connections ZK1+ and ZK1− and ZK2+ and ZK2−, respectively. The half-bridge circuits 2 and 3 can be electrically connected to the intermediate circuit voltage in a manner connected in parallel or in series.

The DC-to-DC converter 1 also comprises a transformer 4. The transformer 4 comprises a first primary winding 4a and a second primary winding 4b and a first secondary winding 4c and a second secondary winding 4d. The first half-bridge circuit 2 is designed to generate an AC voltage at the first primary winding 4a from the intermediate circuit voltage, and the second half-bridge circuit 3 is designed to generate an AC voltage at the second primary winding 4b from the intermediate circuit voltage.

In order to generate the AC voltage, the half-bridge circuit 2 comprises a capacitor C1, transistors M1 and M3 and diodes D1 and D3 which are connected as illustrated. Accordingly, the second half-bridge circuit 3 comprises a capacitor C2, transistors M2 and M4 and diodes D2 and D4 which are connected as illustrated. The transistors M1 to M4 are controlled in a manner known per se in order to generate the AC voltages at the primary windings 4a and 4b.

The DC-to-DC converter 1 also comprises at least one bidirectional power converter circuit 5 which is electrically coupled to the secondary windings 4c and 4d in a bridge arrangement, the bridge arrangement comprising a first bridge connection pole 6 and a second bridge connection pole 7.

The bridge arrangement comprises a first bridge branch comprising transistors M5 and M6 and a second bridge branch comprising transistors M7 and M8. The bridge branches are looped in between the bridge connection poles 6 and 7. The secondary windings 4c and 4d are connected in parallel, a respective first connection of the secondary windings 4c and 4d being electrically connected to a connecting node of the transistors M5 and M6 of one of the bridge branches, and a respective second connection of the secondary windings 4c and 4d being electrically connected to a connecting node of the transistors M7 and M8 of the other of the bridge branches.

A voltage limitation device 8 is looped in between the bridge connection poles 6 and 7. The voltage limitation device 8 comprises a switching element M9 in the form of a transistor and a capacitor C3 connected in series. The switching element M9 is controlled by means of a control device (not illustrated in any more detail) in such a manner that the voltage limitation device 8 implements a so-called active clamp function. With respect to further details of the active clamp function, reference is also made to the relevant specialist literature in order to avoid repetitions.

The active clamp circuit 8 on the secondary side of the transformer 4 enables feedback operation with a high degree of efficiency with good use of the available power semiconductors M1 to M9.

The DC-to-DC converter 1 comprises a first (output) connection pole DC+ and a second (output) connection pole DC−, an (output) voltage being present between the first output connection pole DC+ and the second output connection pole DC−, which voltage has a lower level, for example 24 V DC or 48 V DC, based on the intermediate circuit voltage present at the connections ZK1+ and ZK1− or ZK2+ and ZK2−.

The DC-to-DC converter 1 also comprises a coil L1 and a polarity reversal protection transistor M10, the coil L1 and the polarity reversal protection transistor M10 being looped in in series between the first bridge connection pole 6 and the first output connection pole DC+.

The DC-to-DC converter 1 also comprises a capacitor C4 which is looped in between a connecting node of the coil L1 and of the polarity reversal protection transistor M10 and the second output connection pole DC−.

Figure 2:
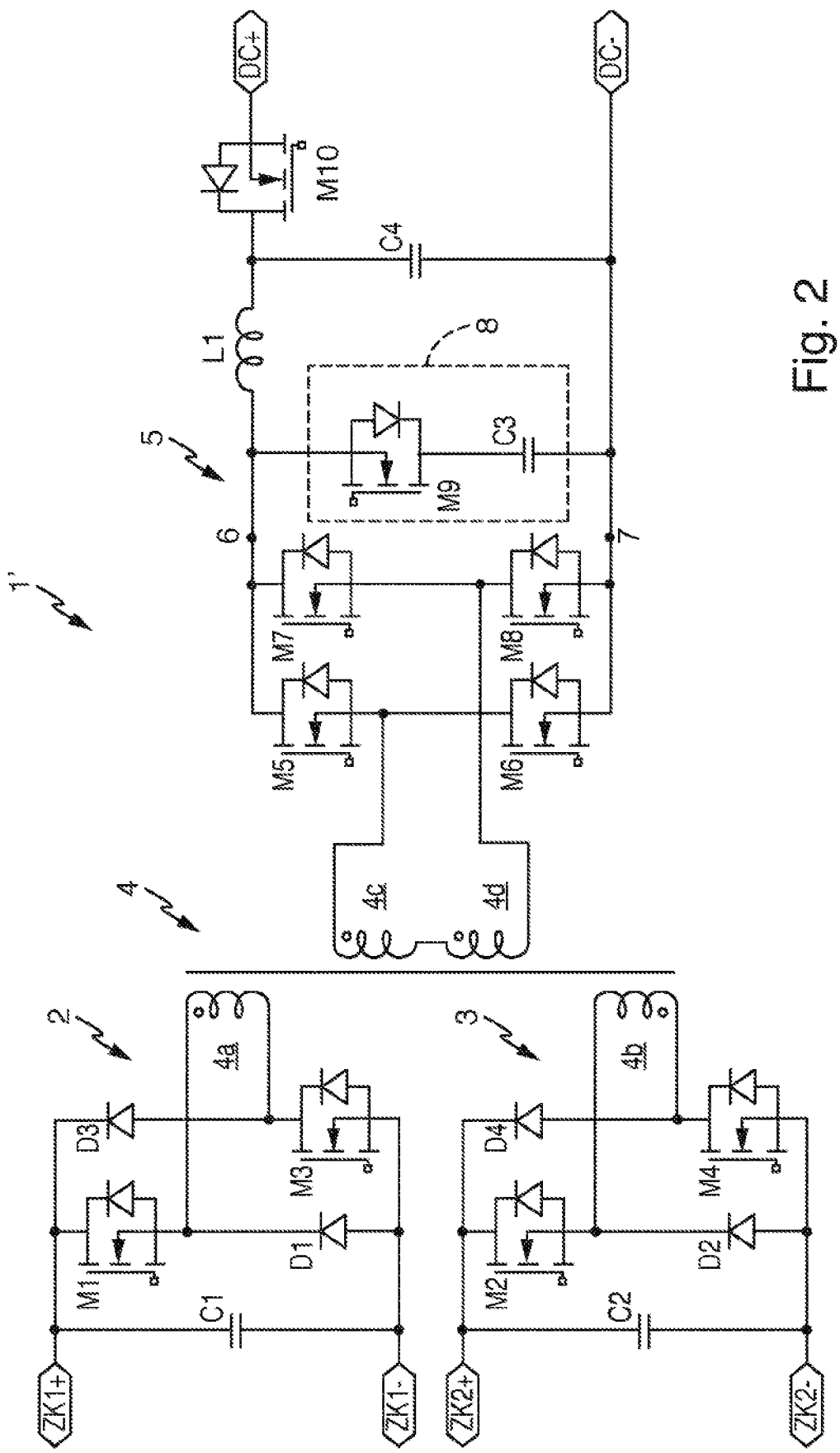
FIG. 2 shows a circuit diagram of a DC-to-DC converter according to the invention in accordance with a further embodiment.

FIG. 2 shows a bidirectional DC-to-DC converter 1' in accordance with a second embodiment. Differing from the embodiment shown in FIG. 1, the secondary windings 4c and 4d are connected in series in the DC-to-DC converter 1', with the result that a higher voltage of 48 V DC can be output at the connections DC+ and DC−, for example. For the rest, the embodiment is identical, with the result that reference is made to the above statements in order to avoid repetitions.

Figure 3:
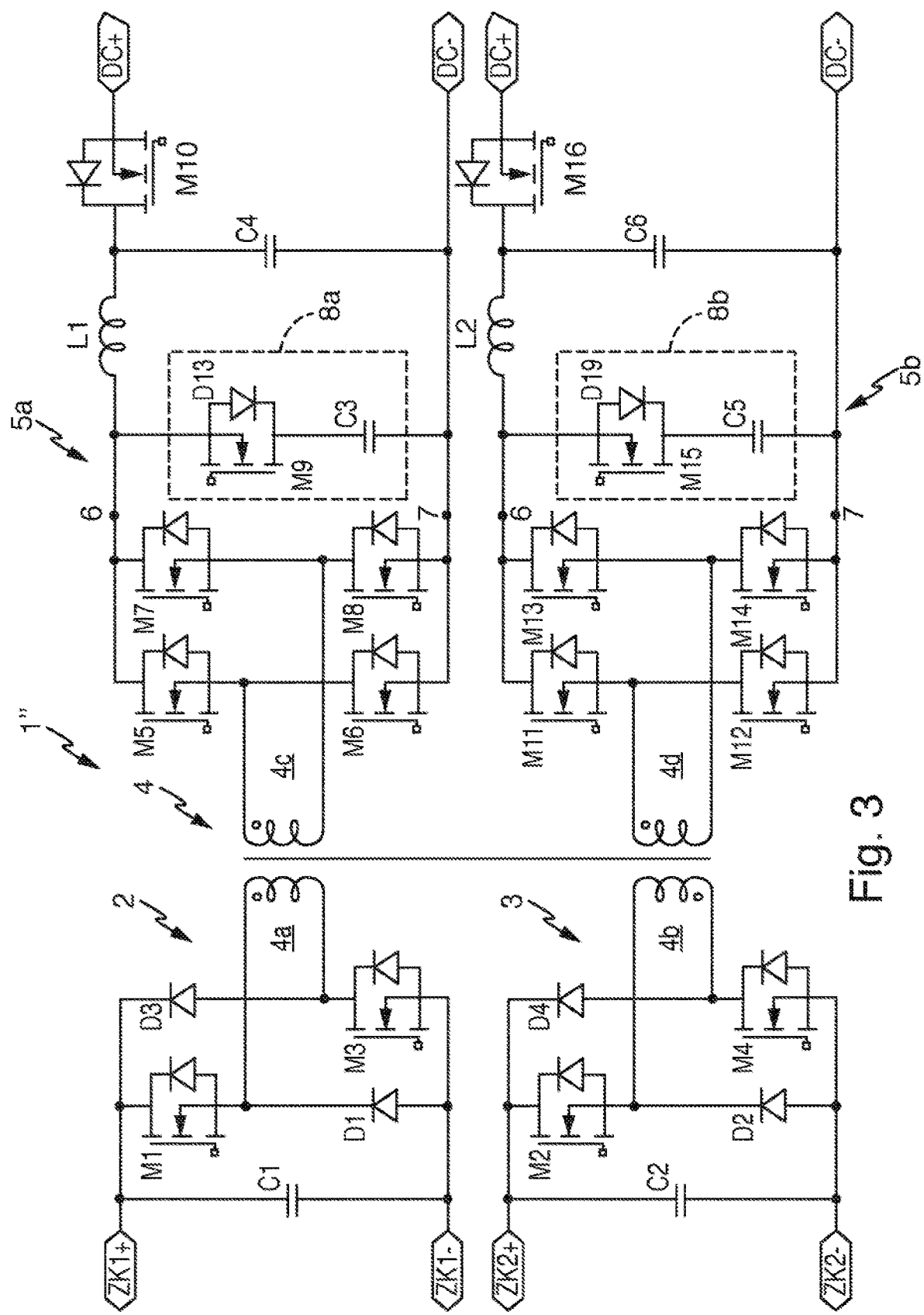
FIG. 3 shows a circuit diagram of a DC-to-DC converter according to the invention in accordance with a further embodiment.

FIG. 3 shows a bidirectional DC-to-DC converter 1" in accordance with a third embodiment. Differing from the embodiment shown in FIG. 1, two power converter circuits 5a, 5b of identical structure are each provided here in a bridge arrangement, the respective structure of which corresponds to the power converter circuit 5 shown in FIG. 1. The second power converter circuit 5b comprises five transistors M11 to M16, two capacitors C5 and C6 and a coil L2 in the connection shown.

The DC-to-DC converter 1" has the greatest flexibility since flexible external changeover (series/parallel connection) of the voltage levels and current ranges is possible both at the high intermediate circuit voltage level (400 V/800 V) and at the low voltage level (24 V/48 V).

Figure 4:
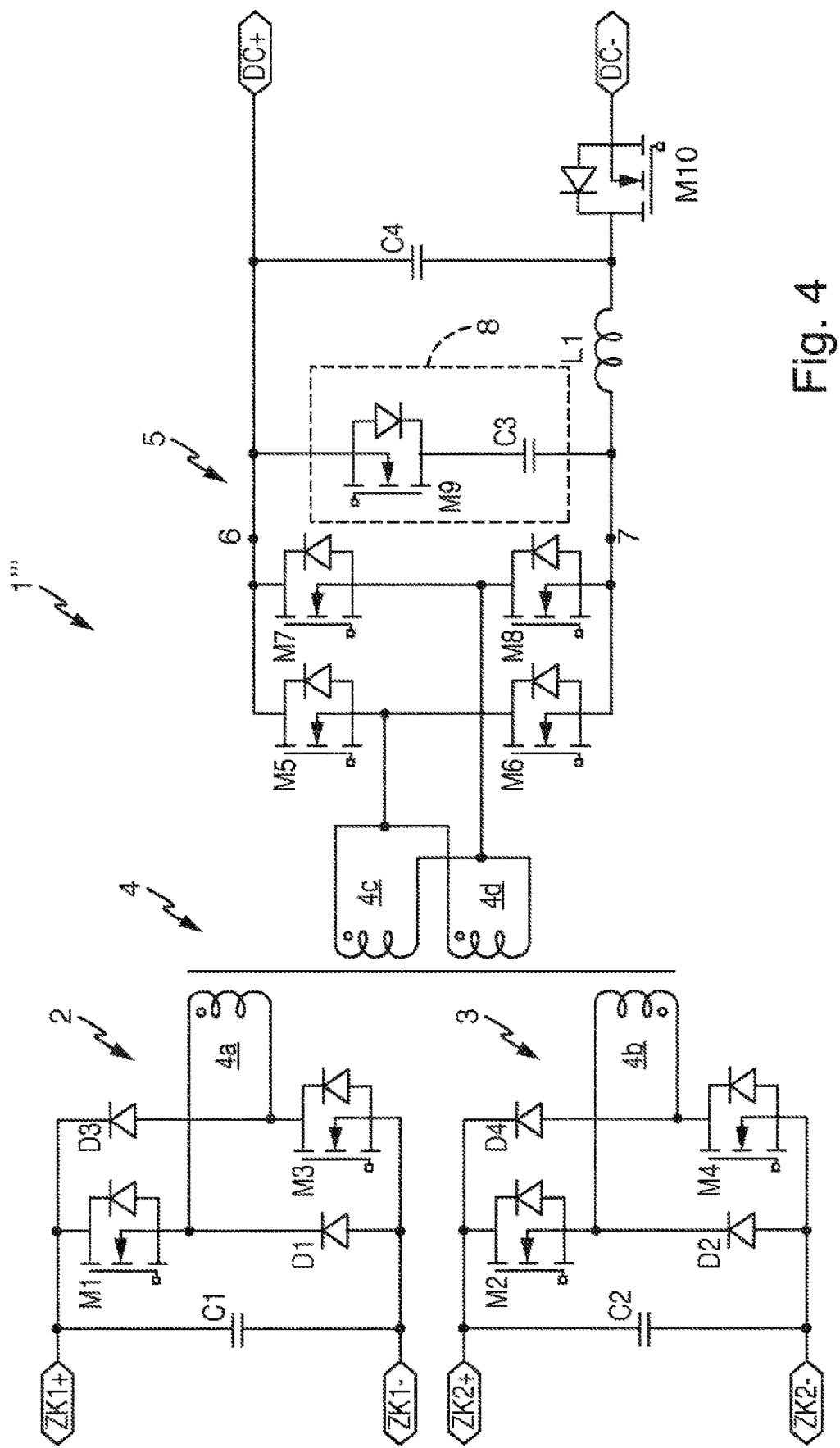
FIG. 4 shows a circuit diagram of a DC-to-DC converter according to the invention in accordance with a further embodiment.

FIG. 4 shows a bidirectional DC-to-DC converter 1''' in accordance with a fourth embodiment. Differing from the embodiment shown in FIG. 1, the coil L1 and the polarity reversal protection transistor M10 are looped in between the second bridge connection pole 7 and the second output connection pole DC−.

All of the switching elements or transistors M1 to M16 shown may be MOSFETs which are each controlled by a control unit (not shown). The control unit may be a microprocessor, for example.

The DC-to-DC converter according to the invention enables bidirectional operation with a high degree of flexibility with respect to the voltage levels and with high power densities.

What is claimed is:

1. A bidirectional DC-to-DC converter, comprising:
   a first half-bridge circuit;
   a second half-bridge circuit;
   a transformer, wherein the transformer comprises two primary windings and at least one secondary winding, the first half-bridge circuit being designed to generate an AC voltage at a first one of the two primary windings, and the second half-bridge circuit being designed to generate an AC voltage at a second one of the two primary windings; and
   at least one bidirectional power converter circuit which is electrically coupled to the secondary winding in a bridge arrangement, the bridge arrangement comprising a first bridge connection pole, a second bridge connection pole, a first bridge branch and a second bridge branch, wherein the first bridge branch and the second bridge branch are looped in between the first bridge connection pole and the second bridge connection pole, wherein the first bridge branch comprises a first transistor and a second transistor and the second bridge branch comprises a third transistor and a fourth transistor, wherein a first terminal of the secondary winding is electrically connected to a connecting node of the first transistor and the second transistor and a second terminal of the secondary winding is electrically connected to a connecting node of the third transistor and the fourth transistor, wherein
   the power converter circuit includes a voltage limitation device comprising a switching element and a voltage limitation capacitor, and
   the switching element and the voltage limitation capacitor are looped in series between the first bridge connection pole and the second bridge connection pole.

2. The bidirectional DC-to-DC converter as claimed in claim 1, further comprising:
   a first output connection pole and a second output connection pole, an output voltage being present between the first output connection pole and the second output connection pole; and
   a coil and a polarity reversal protection transistor, the coil and the polarity reversal protection transistor being looped in series between the first bridge connection pole or the second bridge connection pole and the first output connection pole or the second output connection pole.

3. The bidirectional DC-to-DC converter as claimed in claim 2, further comprising:
   a power converter capacitor, the power converter capacitor being looped in between a connecting node of the coil and of the polarity reversal protection transistor and the second output connection pole.

4. The bidirectional DC-to-DC converter as claimed in claim 1, wherein
   the first half-bridge circuit and the second half-bridge circuit are connected in series or in parallel.

5. The bidirectional DC-to-DC converter as claimed in claim 1, wherein
   the transformer comprises a first secondary winding and a second secondary winding, the first secondary winding and the second secondary winding being connected in series or in parallel.

6. The bidirectional DC-to-DC converter as claimed in claim 1, further comprising:
   a first power converter circuit and a second power converter circuit, the first power converter circuit being electrically coupled to the first secondary winding, and the second power converter circuit being electrically coupled to the second secondary winding.

* * * * *